(12) United States Patent
Bordini

(10) Patent No.: US 7,204,340 B2
(45) Date of Patent: Apr. 17, 2007

(54) TRACTOR REAR SUSPENSION

(75) Inventor: Giorgio Bordini, Tenerife Canarias (ES)

(73) Assignee: CNH America LLC, New Holland, PA (US)

( * ) Notice: Subject to any disclaimer, the term of this patent is extended or adjusted under 35 U.S.C. 154(b) by 306 days.

(21) Appl. No.: 10/911,888

(22) Filed: Aug. 5, 2004

(65) Prior Publication Data

US 2006/0027414 A1   Feb. 9, 2006

(51) Int. Cl.
*B60K 17/04* (2006.01)

(52) U.S. Cl. ............... 180/372; 180/356; 180/343; 180/353

(58) Field of Classification Search .......... 180/342, 180/343, 348, 349, 353, 355, 356, 359, 360, 180/361, 363, 372; 172/439; 280/6.154
See application file for complete search history.

(56) References Cited

U.S. PATENT DOCUMENTS

| | | | | |
|---|---|---|---|---|
| 1,291,816 A | * | 1/1919 | Fielder | 180/356 |
| 1,354,462 A | * | 10/1920 | Burrows | 180/356 |
| 1,370,378 A | * | 3/1921 | Starr | 475/269 |
| 1,373,142 A | * | 3/1921 | Midboe | 180/356 |
| 1,468,410 A | * | 9/1923 | Thompson | 475/159 |
| 2,998,735 A | * | 9/1961 | Elfes | 475/346 |
| 3,157,239 A | * | 11/1964 | Bernotas | 180/235 |
| 4,053,171 A | | 10/1977 | Hyler | |
| 4,614,247 A | | 9/1986 | Sullivan | |
| 5,024,636 A | * | 6/1991 | Phebus et al. | 475/141 |
| 5,404,958 A | | 4/1995 | Weiss | |
| 5,538,264 A | | 7/1996 | Brown et al. | |
| 6,042,131 A | | 3/2000 | Bailey | |
| 6,502,840 B1 | | 1/2003 | Leyonhjelm et al. | |
| 6,722,994 B2 | | 4/2004 | Woods et al. | |
| 2002/0175486 A1 | | 11/2002 | Young et al. | |
| 2003/0047892 A1 | | 3/2003 | Goddard | |

* cited by examiner

*Primary Examiner*—Paul N. Dickson
*Assistant Examiner*—Tiffany L. Webb
(74) *Attorney, Agent, or Firm*—Stephen A. Bucchianeri; John William Stader; Michael G. Harms

(57) ABSTRACT

A tractor has sprung left and right rear suspensions, each suspension including a suspension arm pivotally coupled to the tractor chassis to pivot about a pivot point. A planetary gear system is fixed to the suspension arm having a sun gear driven by the engine and a planetary gear carrier that is coupled to and drives an axle supporting a rear wheel. The ring gear is fixed with respect to the suspension arm.

12 Claims, 8 Drawing Sheets

TRACTOR REAR SUSPENSION

FIELD OF THE INVENTION

The present invention relates generally to suspensions. More particularly, it relates to tractor suspensions, and even more particularly to rear suspensions for agricultural tractors.

BACKGROUND OF THE INVENTION

Agricultural tractors have traditionally been unsprung. From their earliest beginnings in the late 1800's they have been supported on fixed axles extending from the chassis.

Originally tractors were used as stationary engines. Located in a fixed position in a field, farmers would gather crops to be threshed and bring them in wagon loads to the tractor and a belt-driven threshing machine. In these early days the ability to move fast was not important.

Tractors were gradually modified to tow implements such as plows, rakes, harrows, planters, and manure spreaders through agricultural fields. These mobile tractors did not need a great deal of speed since they replaced horses or oxen and needed only enough power to tow implements at horse or ox speed.

As time passed, engineers designed ever larger and stronger implements. To tow these implements, tractors were also made stronger and larger, with ten to fifty times the horsepower of the early tractors.

Eventually, agricultural tractors were capable of towing implements at higher speeds through agricultural fields. To accommodate these greater speeds, manufacturers began to develop front suspensions with springing and shock absorbing capability. These front suspensions were configured to pivot, permitting the front wheels of the tractor to keep a good grip on the ground as the terrain changed. As of today, however, no major manufacturer of tractors sells a commercially accepted agricultural tractor with a sprung rear suspension.

A primary reason that tractors with sprung rear suspensions have not been manufactured is due to the reaction forces that arise when a load is placed on the tractor. Traditional agricultural tractors have large rear wheels, typically on the order of approximately 1 to 2.2 meters in diameter. The large rear wheels apply high force to the ground, especially when a ground-engaging implement is ripping furrows through the ground 2 to 18 inches deep. The ground, in turn, applies an equally high (but in the opposite direction) reaction force on the frame of the tractor, and the reaction force can generate a moment great enough to literally lift the front wheels of a tractor without a rear suspension a meter or more off of the ground.

The existence of a moment large enough to lift the front wheels is best illustrated with reference to FIG. 8, which schematically shows a tractor 700 without a front or rear suspension towing an implement 148. An implement, resultant-force vector 402 is applied to the implement by the ground as the implement is pulled through the ground by the tractor 700. Implement force vector 402 can be broken down into two force vectors 404, 406 that represent the horizontal force (vector 404) acting to drag on the implement during forward motion, and the vertical force (vector 406) that pulls downward on the implement.

The implement is rigidly coupled to the tractor typically through a three-point hitch. The three-point hitch couples the implement to the tractor frame via a lower point A and an upper point B. The implement force vector 402 applies draft forces on the tractor that can be separated into horizontal and vertical forces $F_{Ax}$ and $F_{Ay}$ acting through the lower link 902 (i.e., at point A) and horizontal and vertical forces $F_{Bx}$ and $F_{By}$ acting through the upper link 904 (i.e., at point B). As one of ordinary skill will appreciate, the relative magnitudes of the component draft forces $F_{Ax}$, $F_{Ay}$, $F_{Bx}$ and $F_{By}$ depend upon the geometry of the three-point pitch.

Other forces acting on the tractor 700 include weight (depicted in the drawing as mg), which acts on the center of gravity $C_G$. In response to the weight, the ground applies forces $F_f$ and $F_r$ to the tractor through the front and rear axles, respectively.

There are torques shown in FIG. 8 as well. Drive torque $T_D$ is the torque applied by the engine (not shown in FIG. 8) to the axle (also not shown) to drive the rear wheels. When the tractor is being driven forward, the drive torque is clockwise. The rear wheels, as they are being driven, apply a force on the ground, and the ground, in turn, applies an equal and opposite traction force $F_{Tr}$ on the wheels that is applied to the tractor frame. The traction force of course is responsible for forward movement of the tractor.

Drive torque $T_D$ also generates a reaction torque (that is, traction torque $T_{Tr}$) that acts on the frame of the tractor. The traction torque is proportional to the traction force $F_{Tr}$ and is counterclockwise.

The forces and torques generate moments about a point on the tractor that tend to rotate the tractor about that point. For convenience, the point will be called the center of pitch $C_p$. Its location depends upon a number factors one of ordinary skill will appreciate. While the forces and torques may generate moments that cancel each other out to some extent, the net effect of all of the moments is to generate a counterclockwise moment $M_P$ about the center of pitch when the implement force vector 402 increases. The implement force vector increases when the implement 148 hits a stone, compacted soil, or some other such condition. As previously mentioned, the increased implement force vector can be large enough to cause a moment $M_P$ about the center of pitch that is itself large enough to lift the front tires and increase the load on the rear tires.

If the rear wheels were suspended on the frame rather than being fixed, the moment $M_P$ will not at first lift the front wheels, but it will tend to cause the rear suspension to squat. Such squatting can be disconcerting to the operator and can also wreak havoc on implement depth-control systems, which typically require a constant relationship between the tractor-frame and implement-frame heights.

One of ordinary skill will appreciate that some suspension configurations will cause the tractor to rotate clockwise (rather than counterclockwise, as has been described) when the tractor is subjected to increased loads. However, for the purposes of this discussion, we will consider the more intuitive case where the tractor rotates counterclockwise in response to increased loads. Nevertheless, the basic principles (and the problems with conventional systems) described herein are the same. Moreover, the principle of operation of the preferred embodiments (which will be described below) is the same regardless of whether the suspension tends to squat or sit up.

The suspension arrangement of the present invention generates a reaction torque on the vehicle to reduce the moment $M_P$ about the center of pitch. In other words, when the tractor pulls harder on its implement, the suspension in accordance with the present invention generates an increased counteracting, or reaction, force that matches or is proportional to the increased, horizontal force vector 404. Similarly, when the tractor pulls more gently on its implement, the suspension in accordance with the present invention generates a decreased force that matches the decreased horizontal force vector 404.

SUMMARY OF THE INVENTION

A tractor preferably comprises a sprung rear suspension including a pair of suspension arms, each of which is pivotally connected to the chassis of the tractor.

Each suspension arm supports a planetary gear system including planetary gears that drive a rear wheel. The planetary gear system generates reaction torques applied to the rear suspension arm. As the implement load increases, the reaction torque generated by the planetary gear system also increases. As the implement load decreases, the reaction torque generated by the planetary gear system also decreases. Thus, the planetary gear system automatically generates a reaction torque that is proportional to the force the ground applies to the tire, and the reaction torque applies a reaction force on the suspension arm to counteract the weight transfer to the rear wheels. (As previously mentioned, such weight transfer is the result of the counterclockwise moment about the center of pitch.)

The net result, and a primary benefit of the preferred embodiments, is that the chassis tends to stay at the same height when the tractor is loaded by a horizontal load. This provides a smoother ride for the operator. Moreover, the height of the rear end of the tractor is controlled better so that the depth of an implement can be controlled accurately.

In accordance with one aspect of the invention, a rear suspension for an agricultural tractor having a longitudinally extending chassis and two rear drive wheels is provided, including a suspension arm pivotally couplable to the chassis at a first pivot point to pivot about a pivot axis; a spring coupled to the suspension arm and couplable to the chassis; a planetary gear system fixed to the suspension arm, the gear system including a planetary gear carrier and a ring gear fixed with respect to the suspension arm; and an axle having a rotational axis, the axle being fixed to the planetary gear carrier and configured to support a rear wheel of the agricultural tractor.

The rotational axis may be located above and behind the pivotal axis. The spring may include a hydraulic cylinder couplable to a gas-charged hydraulic accumulator. The planetary gear system may include a sun gear and the tractor may further include a drive shaft including dual flexible couplings; the drive shaft being drivingly coupled to the sun gear. The drive shaft may be configured to extend laterally from a differential to the sun gear, respectively. The gear system may include a ring gear carrier that is fixed to the suspension arm. The gear system may include a pair of bearings that extend between the ring gear carrier and the planetary gear carrier to support the planetary gear carrier for rotation with respect to the ring gear carrier. The pair of bearings may support the planetary gear carrier for rotation inside the ring gear carrier. The pair of bearings may support the planetary gear carrier for rotation about the outside of the ring gear carrier.

In accordance with another aspect of the invention, a tractor is provided including two such suspensions, one disposed on the left rear of the tractor and one disposed on the right rear of the tractor.

Numerous other features and advantages of the present invention will become readily apparent from the following detailed description, the accompanying drawings, and the appended claims.

DETAILED DESCRIPTION OF THE PREFERRED EMBODIMENTS

Figure 1:
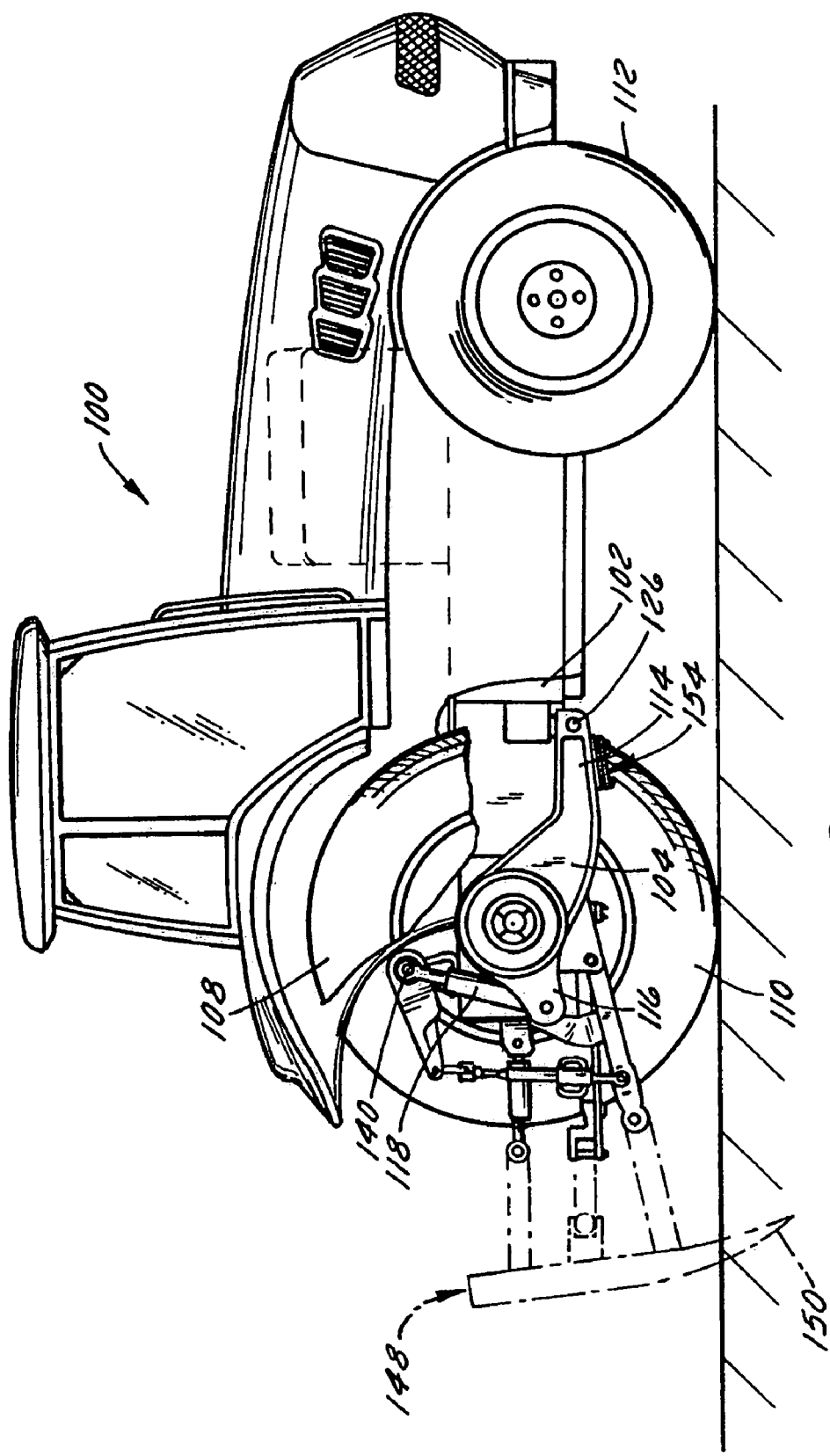
FIG. 1 is a side view of a tractor in accordance with the present invention.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

The tractor rear suspension according to the preferred embodiments is constructed in such a way that increases in implement forces (which may occur when, for example, a plow or ripper implement being drawn by a tractor comes across a buried object such as a rock or root) are at least partially compensated for by the rear suspension and the final-drive transmission. In other words, the rear suspension according to the preferred embodiments is effectively instantaneously stiffened proportionately to the magnitude of the load.

Figure 2:
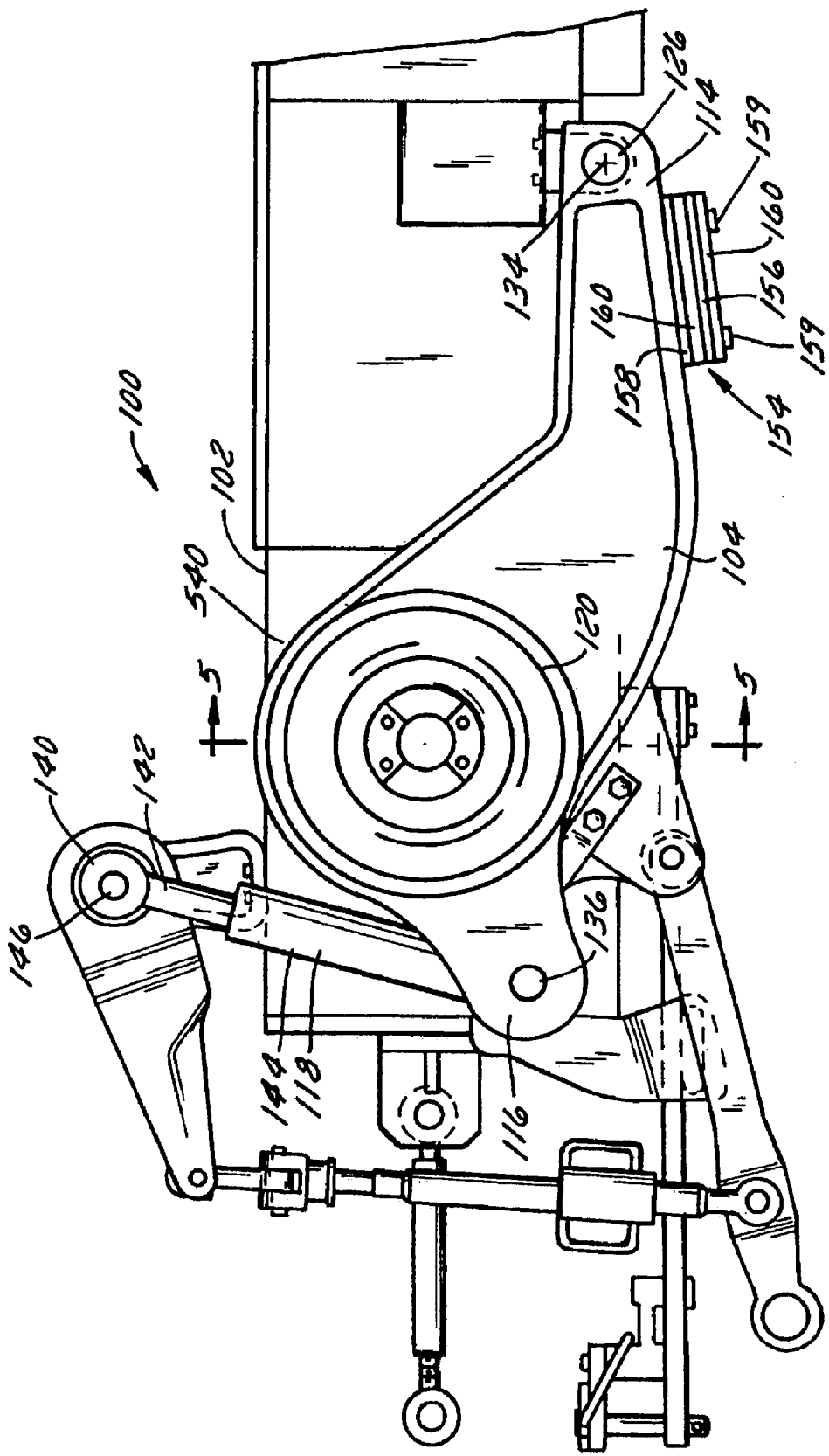
FIG. 2 is a fragmentary side view of the tractor of FIG. 1, showing the chassis and rear suspension in greater detail.
Figure 3:
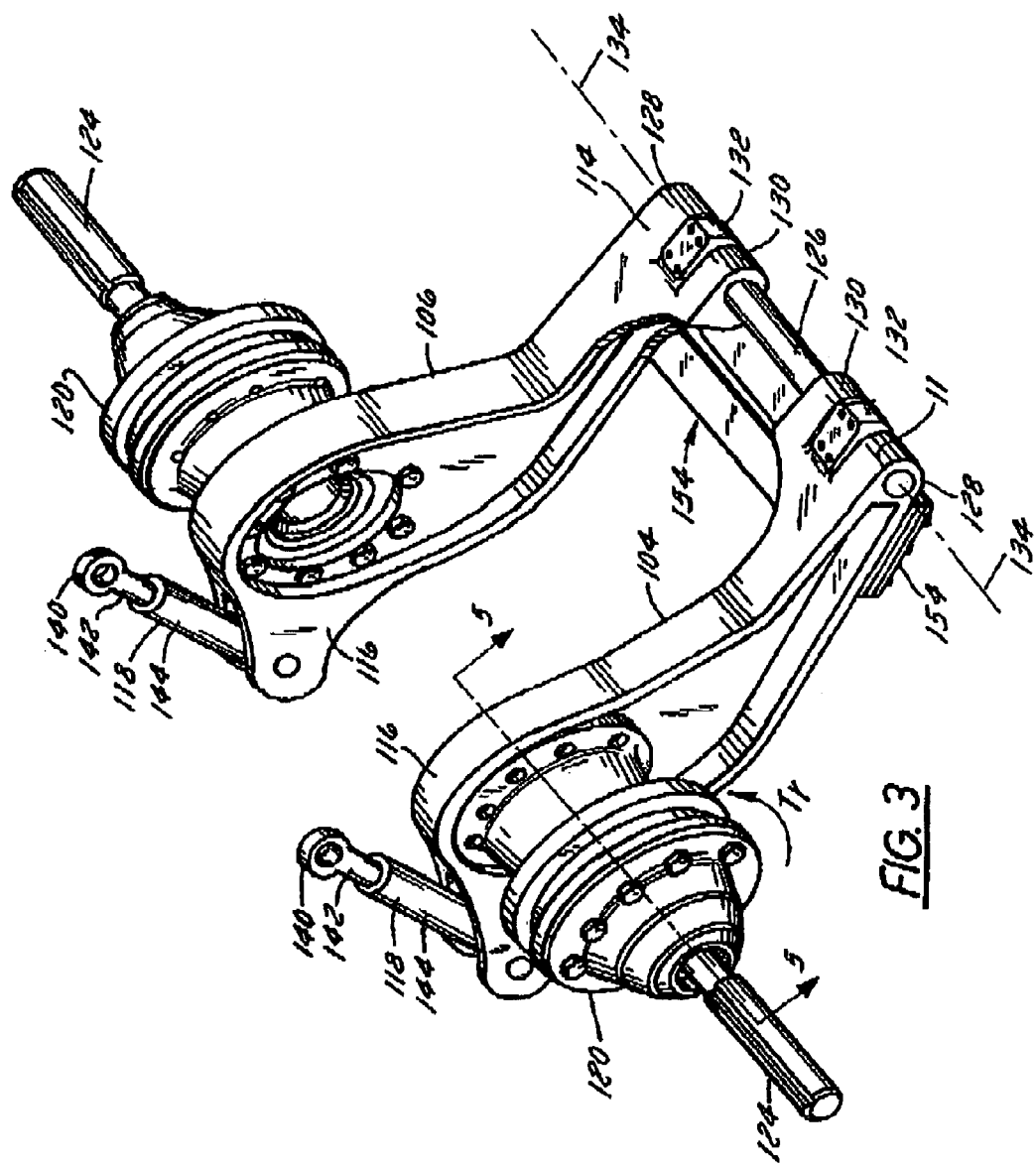
FIG. 3 is a perspective view of the suspension arms, springs, linkage and pivot pin of the tractor of the foregoing FIGURES.

FIGS. 1, 2 and 3 show a tractor 100 including a chassis 102 to which right and left suspension arms 104,106 (FIG. 3) are coupled. Rear wheels 108,110 are mounted to axles 124 extending from suspension arms 104,106 and support the tractor for movement over the ground. Two front wheels 112 are coupled to the front portion of the chassis to support the front of the vehicle.

Referring in particular to FIG. 3, each suspension arm 104,106 has a front end 114 and a rear end 116. The front end 114 is pivotally coupled to the chassis and the rear end 116 is supported by a spring 118. Spring 118 in the preferred embodiment shown here is a hydraulic cylinder that is coupled to a hydraulic circuit including valves and a gas-charged hydraulic accumulator (circuit not shown) to keep the spring 118 extended the appropriate amount. The circuit and method of properly charging the accumulator and the hydraulic cylinder are beyond the scope of this application and are not discussed herein. Moreover, other springs besides the hydraulic spring shown may be employed with the rear suspension according to the preferred embodiments without departing from the spirit of the invention. Such other springs include leaf springs and coil springs.

A planetary gear system 120 is fixed to the rear end 116 of each suspension arm. The planetary gear system 120 supports the axle 124 that extends from the gear system.

The front end 114 of each suspension arm 104,106 is preferably coupled to chassis 102 by a pin 126. Pin 126 extends through an inner eye member 130 and an outer eye member 128 formed in the front end 114 of the suspension arm. Pin 126 also extends through an eye member 132 (FIG. 3) that is fixed to chassis 102 and fits between the inner and outer eye members 128, 130 on the suspension arms 104, 106. Pin 126, eye members 128, 130 and eye member 132 are closely toleranced, such that suspension arms 104, 106 are constrained by pin 126 to rotate about a laterally extending axis 134 best seen in FIG. 3. This arrangement also constrains the rear ends 116 of the two suspension arms to pivot about axis 134 and (in general) to move only up and down with respect to the chassis 102.

Referring to FIG. 2, each spring 118 is coupled at its lower end to its associated suspension arm by a pivot pin 136 that extends through the suspension arm and through an eye formed in the lower end of the spring 118. This arrangement permits the lower end of the spring 118 to pivot with respect to the suspension arm. A similar eye 140 is formed in the upper end of rod 142 extending from the hydraulic cylinder body 144 which is similarly pivotally coupled to a pin 146. Pin 146 is fixed to chassis 102 preferably via the tractor's rockshaft. However, the rod 142 may be coupled to the chassis at other locations.

The suspension arms pivot freely with respect to the chassis 102 with only two limits to their movement: the springs 118 and inter-arm, or sway, link 154. As shown in FIG. 3, link 154 is coupled to and extends between both of the suspension arms 104,106. The sway link 154 is essentially an anti-roll bar providing a passive, anti-roll function. The sway link 154 can be used alone or in conjunction with other anti-roll features, such as active control of hydraulic springs 118. Such active anti-roll will be discussed in more detail below.

The sway link 154 operates in the following way. When one wheel goes over a bump causing its suspension arm to pivot upward, the pivoting suspension arm flexes one end of link 154. The other end of link 154 is connected to the other suspension arm and reacts to this movement by attempting to pivot the other suspension arm upward to the exact same degree that the first suspension arm pivoted. The second suspension arm, however, is resting on ground (via the axle and wheel) at a slightly different height and is held against the ground by its own spring 118. Spring 118 of the second suspension arm resists the upward movement of the second suspension arm by link 154, preventing link 154 from moving the second suspension arm into a perfectly parallel relationship with the first suspension arm. As a result, both suspension arms do not move together to the same (i.e. parallel) positions, and the link 154 twists. The link thereby acts as a torsional spring to resist rolling motion by the tractor.

The link's ability to twist is due to its construction. As shown in FIG. 2, link 154 is formed as two parallel plates of steel 156,158 that are spaced apart by spacers 160. Bolts 159 (FIG. 2) are inserted into holes in the ends of the plates and the spacers. These bolts are inserted into threaded holes in the suspension arms 104,106 and tightened. Bolts 159 are located on each end of link 154 to secure left and right ends of link 154 to the left and right suspension arms, respectively.

Besides using the sway links 154 as a passive anti-roll mechanism, the springs 118 can be actively controlled to provide additional anti-roll. For example, if the right rear wheel rides over a bump while the left rear wheel descends into a dip, the spring 118 on the right can be retracted by appropriate hydraulic control and the spring 118 on the left can be extended to maintain the tractor level.

Figure 4:
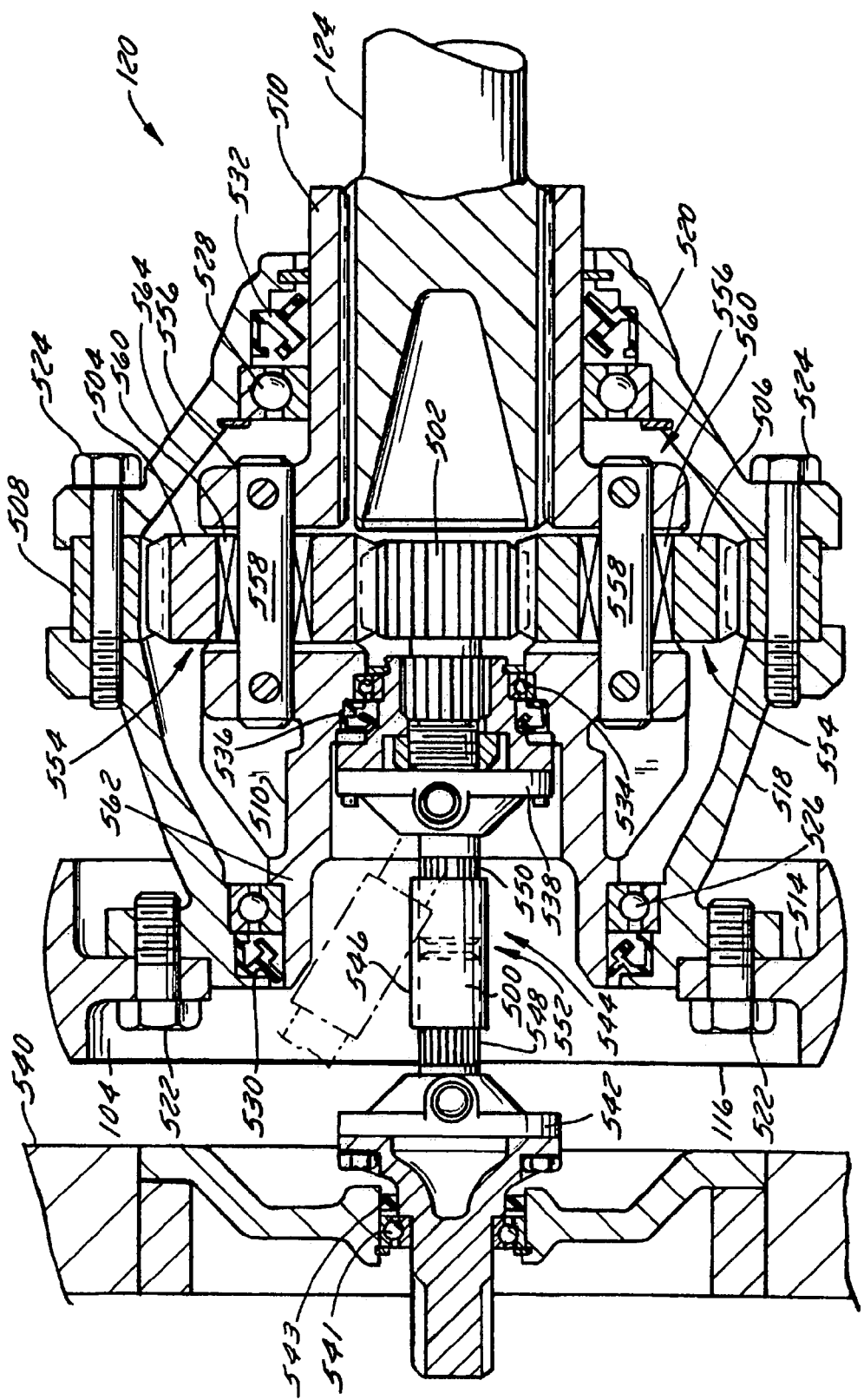
FIG. 4 is a cross-sectional view of a preferred planetary gear system taken at section line 5—5 in FIG. 2.

FIG. 4 illustrates a preferred planetary gear arrangement of the suspension arms 104,106 of FIGS. 1–3. FIG. 4 is a cross section through the planetary gear system 120 of the right side suspension arm. It is taken at section line 5—5 of FIG. 2. The cutting plane that defines section 5—5 passes through the centerline of right side axle 124 to which the right wheel is mounted.

The discussion below relates to the right side planetary gear system. The left side planetary gear system is identically disposed and configured as the right side planetary gear system, but in mirror image form and on the opposite side of the vehicle on the left side suspension arm. Since the two are identical in construction and operation, we do not separately discuss the left side planetary gear system.

As shown in FIG. 4, planetary gear system 120 includes a drive shaft 500 that is coupled to a sun gear 502. The tractor engine, typically through a drive shafted connected to the engine's crankshaft and a set of differential gears, drives sun gear 502, which drives three planetary gears that engage a ring gear 508 (only two planetary gears 504,506 are shown in FIG. 4).

In the embodiment of FIG. 4 the sun gear preferably has 15 teeth and the ring gear preferably has 73 teeth, although one of ordinary skill will appreciate that any number of teeth may be used without departing from the scope of the invention. The planetary gears drive planetary gear carrier 510, which is coupled to and drives right side axle 124.

The gear system according to the embodiment shown in FIG. 4 comprises two casings 518 and 520. Casing 518 is bolted to outer wall 514 of suspension arm 104 by bolts 522. Casing 520 is bolted to casing 518 by bolts 524. Ring gear 508 is fixed between the two casings 518,520 and is fixed to the two casings to make a rigid casing when bolts 524 are tightened.

Casings 518,520 support two bearings 526 and 528, respectively, on their inner surfaces. These two bearings 526,528 support the planetary gear carrier 510. Bearings 526 and 528 support the entire weight of the right rear side of the vehicle. Since the wheels may be mounted on axle 124 at some distance from bearings 526,528, there may be a considerable overhanging load acting on these bearings. For this reason, they are preferably spaced apart a distance of several hundred millimeters, preferably at least 460 mm. The spacing of the bearings may be increased or decreased in application as is necessary; but one of ordinary skill will appreciate that greater bearing spacing—as is achieved in the preferred embodiment of this invention—is preferred because it withstands the overhanging load better than relatively narrow spacing.

Casings 518 and 520 also support two seals 530 and 532 that are disposed to seal against the inner and outer ends, respectively, of planetary gear carrier 510. These seals keep gear lubricant inside gear housing 516 and ensure that the gears are bathed in lubricant.

Axle 124 is force fit to planetary gear carrier 510 to collectively form a rigid rotating member that is disposed inside housing 516. As will be described in detail below, the planetary gear carrier 510 is in the form of a hollow cylinder that is configured to receive and support the sun gear for rotation in the inboard end of the carrier 510 and to receive (and be fixed to) the axle 124 in the outboard end of the carrier 510.

The sun gear 502 is supported inside the inboard hollow end of the gear carrier 510 on bearing 534. Bearing 534 permits free rotation of the sun gear 502 with respect to gear carrier 510. A seal 536 is fixed on the outboard side of the bearing 534 to ensure that gear lubricant does not leak out of housing 516 between the sun gear shaft and the inner surface of gear carrier 510.

Drive shaft 500 includes a first flexible coupling 538 (e.g. a universal joint or constant velocity joint) that is coupled to and drives sun gear 502. Coupling 538 permits the suspension arm 104 to pivot, or travel, up and down with respect to the differential housing 540.

The left end (in the FIGURE) of drive shaft 500 is supported for rotation in differential housing 540 by bearing 541, which permits the end of the drive shaft to rotate with respect to the differential housing. A seal 543 seals against drive shaft 500 and differential housing 540 to prevent differential-housing lubricant from leaking out of the differential housing. The differential gears to which the left end of drive shaft 500 is coupled have been removed for clarity of illustration in this FIGURE.

Drive shaft 500 includes a second flexible coupling 542. Coupling 542 also permits the suspension arm 104 to pivot up and down with respect to differential housing 540.

Drive shaft 500 includes a central shaft portion 544 that is disposed between and couples both flexible couplings. This central portion includes a sleeve 546 with a splined inner surface. Sleeve 546 slides over and couples the splined outer surfaces of two stub shafts 548 and 550. A small space 552 is provided between the ends of shaft portions 548 and 550 to ensure that the two shaft portions never abut in any operating position of suspension arm 104 with respect to differential housing 540.

Gear carrier 510 may be formed as a single cylindrical casting including a flared central portion, which includes machined bearing mounts and three machined slots 554 (two shown in FIG. 4) to receive the three planetary gears. Through holes 556 are machined in the carrier 510 to receive planetary gear axles 558. Bearings 560 are disposed between the planetary gears and their respective axles to support the planetary gears for rotation on their axles.

In an alternative arrangement, however, gear carrier 510 is formed from two castings, rather than a single casting. A flanged, inner cylindrical portion 562 and a flanged, outer cylindrical portion 564 of planetary gear system 120 may be separately cast and subsequently bolted together with their flanged ends facing each other.

It should be noted that FIG. 4 shows two planetary gears 504,506 that are spaced apart by 180 degrees about drive shaft 500. All three planetary gears are actually disposed at 120 degrees with respect to one another about the longitudinal axis of the planetary gear system 120. It is for ease of illustration, understanding, and explanation that only two planetary gears are shown in FIG. 5 and that they are shown spaced 180 degrees apart.

The two casings 518,520 are preferably generally conical. Casing 518 is preferably in the form of a conical section with its vertex pointing inward toward the differential housing and casing 520 is preferably in the form of a conical section with its vertex pointing away from the differential housing. This conical configuration provides a flaring inner surface on both casings that makes it easy to mount the seals and the bearings.

Figure 5:
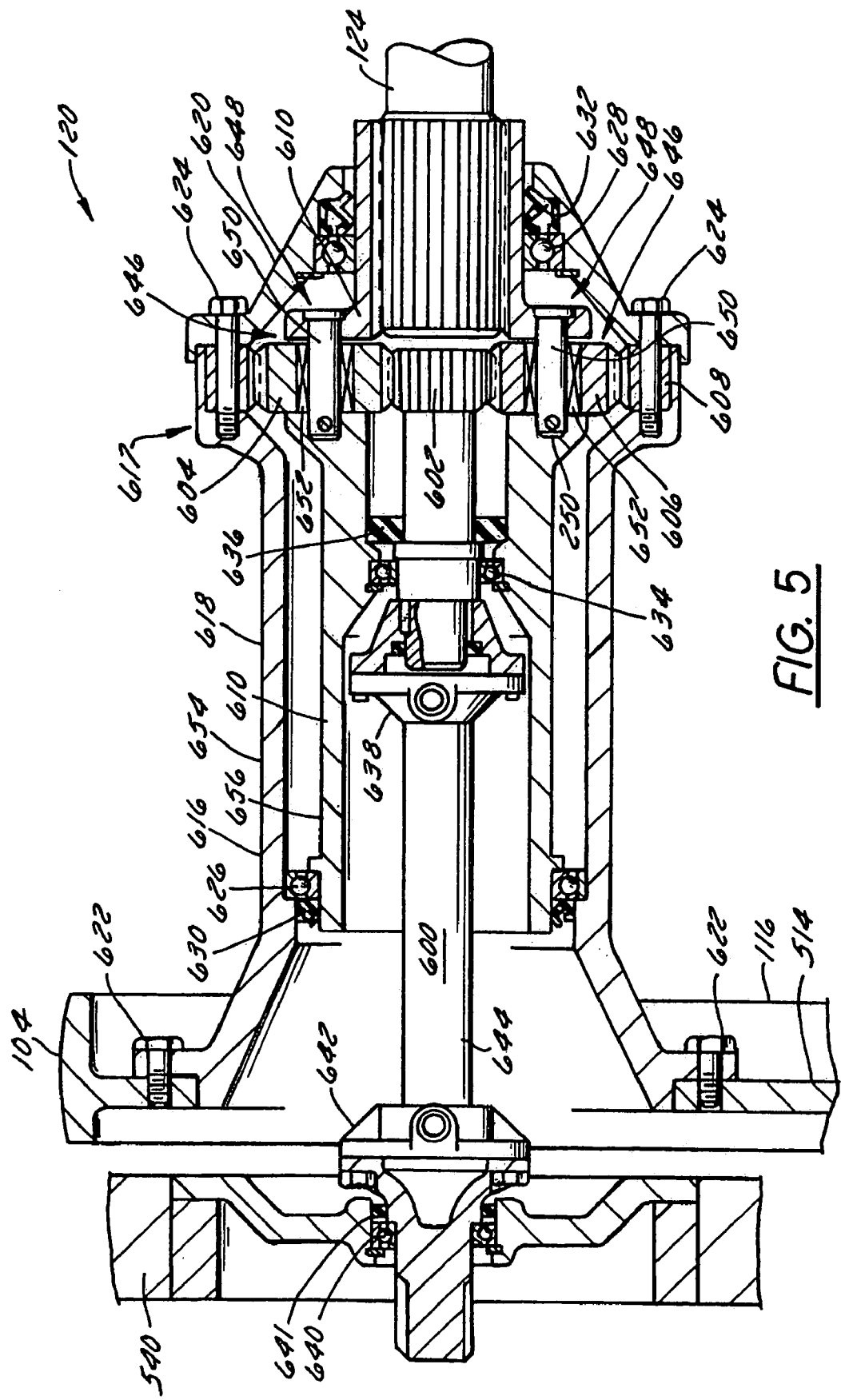
FIG. 5 is a cross-sectional view of a first alternative planetary gear system satisfactory as a substitute for the gear system of FIG. 4. The gear system is shown as it would appear if mounted on the suspension arms as shown in the FIGURES and sectioned along section line 5—5 in FIG. 2.

Another, alternative planetary gear system 120 is shown in FIG. 5. Planetary gear housing 616 substantially houses a drive shaft 600 that is coupled to a sun gear 602. The tractor engine drives shaft 600, which drives sun gear 602, which drives three planetary gears that engage a ring gear 608 (only two planetary gears 604,606 are shown in FIG. 5). In the embodiment of FIG. 5 the sun gear preferably has 15 teeth and the ring gear preferably has 73 teeth. The planetary gears drive planetary gear carrier 610, which is coupled to and drives right side axle 124.

Ring gear 608 is fixed to a ring gear carrier or mount portion 617 of gear housing 616. Gear housing 616 comprises inner and outer casings 618 and 620. Inner casing 618 is bolted to outer wall 514 of suspension arm 104 by bolts 622. Outer casing 620 is bolted to inner casing 618 by bolts 624. Ring gear 608 is fixed to and between the two casings 618,620 to make a rigid gear housing and ring gear carrier portion 617 when bolts 624 are tightened.

Casings 618,620 support two bearings 626 and 628, respectively, on their inner surfaces. These two bearings 626,628 support the planetary gear carrier 610. Bearings 626 and 628 support the entire weight of the right rear side of the vehicle. Since the wheels may be mounted on axle 124 at some distance from bearings 626,628, there may be a considerable overhanging load acting on these bearings. For this reason, they are preferably spaced apart a distance of at least 460 mm. Casings 618 and 620 also support two seals 630 and 632 that are disposed to seal against the inner and outer ends, respectively, of planetary gear carrier 610. These seals keep gear lubricant inside the planetary gear housing 616 and insure that the gears are bathed in lubricant.

Axle 124 is force fit to planetary gear carrier 610 to collectively form a rigid rotating member that is disposed inside housing 616. As will be described in detail below, the planetary gear carrier 610 is in the form of a hollow cylinder that is configured to receive and support the sun gear for rotation in the inboard end of the carrier 610 and to receive (and be fixed to) the axle 124 in the outboard end of the carrier 610.

The sun gear 602 is supported inside the inboard hollow end of the gear carrier 610 on bearing 634. Bearing 634 permits free rotation of the sun gear 602 with respect to gear carrier 610. A seal 636 is fixed between gear carrier 610 and sun gear 602 to ensure that gear lubricant does not leak out of housing 616 between the sun gear shaft and the inner surface of gear carrier 610.

The left end (in the FIGURE) of drive shaft 600 is supported for rotation in differential housing 540 by bearing 640, which is disposed between the differential housing and the left end of drive shaft 600. A seal 641 is also disposed between the left end of the drive shaft and the differential housing to prevent lubricant from leaking out of the differential housing. The differential gears to which the left end of drive shaft 600 is coupled have been removed for clarity of illustration in this FIGURE.

Drive shaft 600 includes a first flexible coupling 638 (e.g. a universal joint or constant velocity joint) that is coupled to and drives sun gear 602. Coupling 638 permits the suspension arm 104 to pivot up and down with respect to the differential housing 540.

Drive shaft 600 includes a second flexible coupling 642. Coupling 642 also permits the suspension arm 104 to pivot up and down with respect to differential housing 540.

Drive shaft 600 includes a central shaft portion 644 that is disposed between and couples both of the flexible couplings. This central portion is configured the same as central portion 544 of the FIG. 4, including a sleeve with a splined inner surface (not shown in FIG. 5) that is splined to two stub shafts.

Gear carrier 610 may be formed as a single cylindrical casting having machined bearing mounts and three machined slots 646 (two shown in FIG. 5) to receive the three planetary gears. Through-holes 648 are machined in the carrier 610 to receive planetary gear axles 650. Bearings 652 are disposed between the planetary gears and their respective axles to support the planetary gears for rotation on their axles.

Alternatively, as in the embodiment shown in FIG. 4, the carrier 610 may comprise two, flanged, cylindrical casings bolted together with the flanges facing each other. The planetary gears would rotate in machined slots formed in the flanges.

FIG. 5 shows just two planetary gears 604,606 that are spaced apart by 180 degrees about drive shaft 600. Nevertheless, there are preferably three planetary gears in the embodiment of FIG. 5. All three planetary gears are disposed at 120 degrees with respect to one another about the longitudinal axis of the planetary gear system 120. It is for ease of illustration, understanding, and explanation that only two planetary gears are shown in FIG. 6 and that they are shown spaced 180 degrees apart.

The two casings 618,620 of the housing 616 of FIG. 5 are preferably configured to provide a wide base of support and resistance to flexure of the gear carrier 610 and axle 600. In particular, casing 618 preferably has an elongated cylindrical portion 654. Portion 654 has a smaller diameter than the flange coupling casing 618 to suspension arm 104. Similarly, gear carrier 610 preferably includes an elongated cylindrical portion 656.

In the above-described arrangement shown in FIG. 5, the housing 616 is supported in cantilever fashion on the suspension arm, and the carrier 610 is prevented from pivoting out of alignment with the longitudinal axis of the housing 616 by the pair of spaced bearings 628, 626. In turn, the sun gear 602 is prevented from pivoting out of alignment by bearing 634, which is disposed inside of the carrier 610.

Figure 6:
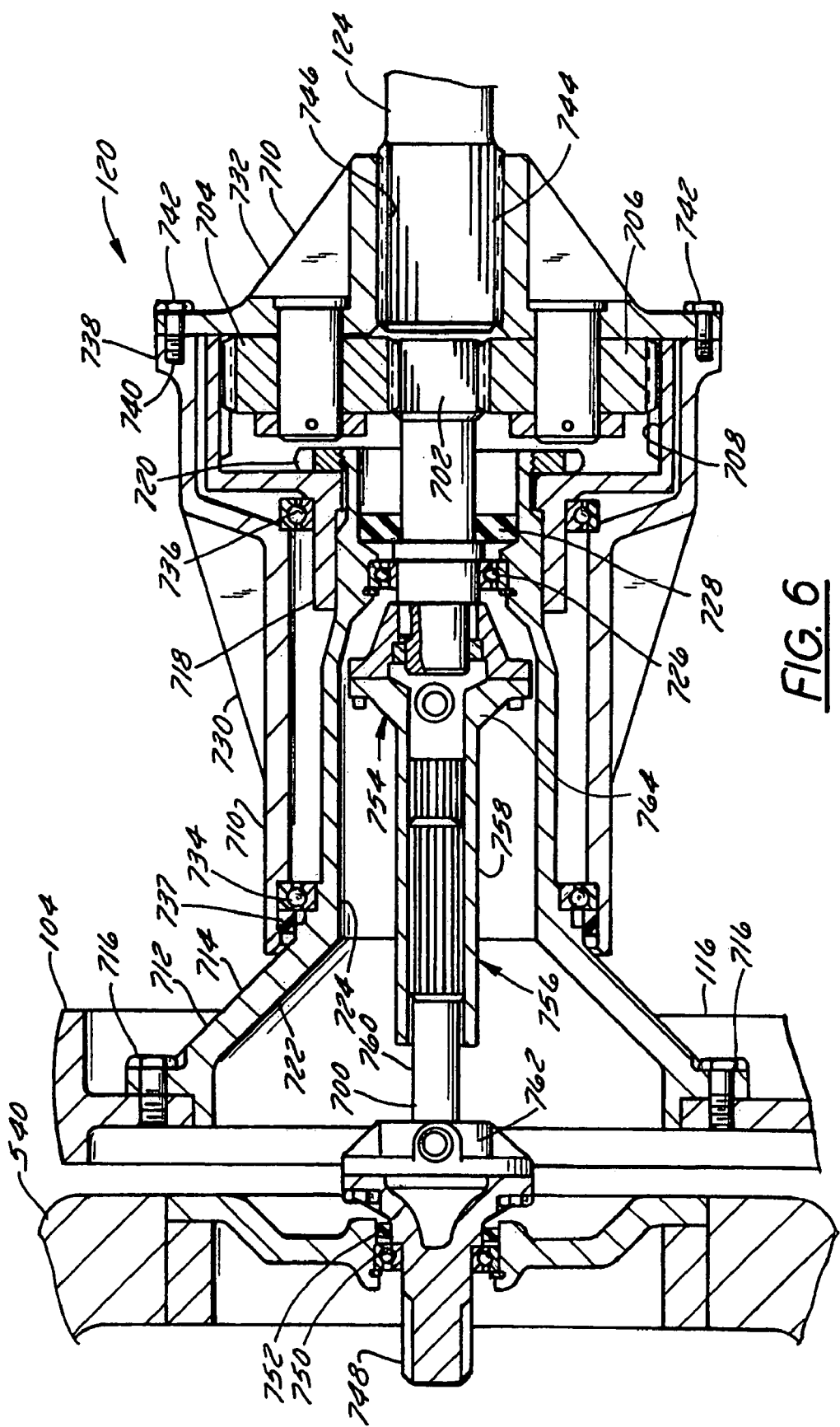
FIG. 6 is a cross-sectional view of a second alternative planetary gearbox satisfactory as a substitute for the gearbox of FIG. 4 or 6. The gear system is shown as it would appear if mounted on the suspension arms as shown in the FIGURES and sectioned along section line 5—5 in FIG. 2.

FIG. 6 illustrates a third embodiment of the planetary gear system 120 that can be used in place of the planetary gear systems 120 of FIGS. 4 and 5. It is shown as it would appear when mounted on right side suspension arm 104 and sectioned along section line 5—5 in FIG. 2.

Planetary gear system 120 of FIG. 6 differs in several respects from the embodiments of FIGS. 4 and 5. In particular, in this arrangement, the rotating planetary gear carrier is supported on the outside of the stationary ring gear carrier. Further, instead of providing bearings on the inside of the stationary ring gear carrier (i.e. the "housing" in FIGS. 4 and 5), bearings are instead provided on the outside surface of the stationary ring gear carrier. Instead of having bearings on the outside of the rotating planetary gear carrier to support it for rotation, the bearings are on the inside of the rotating planetary gear carrier. Instead of having the sun gear supported for rotation in bearings fixed to the inside of the planetary gear carrier, the sun gear is supported for rotation inside the ring gear carrier. These are the primary (but not the only) differences between the arrangement of FIG. 6 and the arrangement of FIGS. 4 and 5.

In FIG. 6, a drive shaft 700 is coupled to a sun gear 702 and extends from differential housing 540. Sun gear 702 drives three planetary gears (only two, 704,706 are shown) that engage a ring gear 708. A planetary gear carrier 710 is coupled to and drives right side axle 124.

A ring gear carrier 712 fixes ring gear 708 with respect to suspension arm 104, preventing it from rotating. Ring gear carrier 712 further includes a drive shaft housing 714 that is fixed to suspension arm 104 by bolts 716, and a ring gear support 718 that is fixed to the drive shaft housing 714 by a threaded nut 720.

78 The drive shaft housing 714 has the general form of a conical section 722 formed integral with an elongated right circular cylindrical portion 724. The end of the cylindrical portion 724 includes keys formed on an outer surface that interengage with grooves formed in an inner surface of ring gear support 718. The splined surface of the drive shaft housing and the ring gear support are held together by nut 720 that is screwed onto threads on the outer surface of drive shaft housing 714. Ring gear 708 is formed on or coupled to an inner surface of ring gear support 718.

The hollow central portion of drive shaft housing 714 encloses drive shaft 700, which extends away from differential housing 540, through suspension arm 104 and thence to sun gear 702. Drive shaft housing 714 also supports sun gear 702 for rotation on bearing 726. Bearing 726 is coupled to and between drive shaft housing 714 and the shaft of sun gear 702 to permit the sun gear to rotate with respect to the drive shaft housing and to drive the planetary gears. A seal 728 is coupled to and between the shaft of sun gear 702 and drive shaft housing 714 to prevent the leakage of lubricant from around the planetary gears.

Planetary gear carrier 710 includes two components: an inner cylindrical portion 730 that is supported for rotation on ring gear carrier 712, and an axle mount 732 that is bolted to the distal end of cylindrical portion 730.

Cylindrical portion 730 is supported for rotation on two bearings 734,736 that are disposed on the outer surface of ring gear carrier 712 and support the inner surface of cylindrical portion 730. A seal 737 is provided that is coupled to and extends between the inner surface of cylindrical portion 730 and the outer surface of ring gear carrier 712 to prevent the leakage of planetary gear lubricant. Cylindrical portion 730 flares at its distal end to surround stationary ring gear 708. Cylindrical portion 730 has a flange 738 at its distal end with several threaded holes 740. Axle mount 732 abuts flange 738 and is fixed thereto by bolts 742. Bolts 742 extend through holes in axle mount 738 and are threadedly engaged to holes 740 in cylindrical portion 730. When bolts 742 are tightened, inner cylindrical portion 730 and axle mount 732 are rigidly fixed to one another. Axle 124 preferably has a keyed outer surface 744 that is force fit into a grooved surface 746 in axle mount 732, although other arrangements, such as bolts, pins or adhesives, are contemplated. Thus, axle 124, axle mount 732, and cylindrical portion 730 together form a rigid structure that is mounted for rotation on bearings 734 and 736. Axle 124 is sufficiently long to support one or two rear wheels. Bearings 734 and 736 must therefore be capable of handling a significant overhanging load. They are preferably spaced a few hundred millimeters apart, preferably 320 mm apart.

Like drive shafts 500 and 600, drive shaft 700 permits suspension arm 104 to travel or move up and down with respect to differential housing 540 by increasing and decreasing in length and by permitting axial misalignment of the sun gear and the end 748 of shaft 700 supported in the differential housing. End 748 of drive shaft 700 is supported for rotation in the differential housing 540 by bearing 750. A seal 752 is also disposed between the differential housing and end 748 to prevent lubricant from leaking out of the differential housing 540. Differential gears (not shown, but of conventional construction) are coupled to end 748 of drive shaft 700 to drive it in rotation. The other end of drive shaft 700 is coupled to sun gear 702 to drive the sun gear in rotation. A central portion 756 of drive shaft 700 includes a hollow internally grooved portion 758 that is slidingly engaged to an externally keyed portion 760. End 748, central portion 756, and end 754 are coupled together with flexible couplings 762 and 764. These couplings permit the relative movement (up and down) of one end of drive shaft 700 with respect to the other. The splined central portion also permits the relative movement (in and out) of one end of drive shaft 700 with respect to the other. Relative movement in both directions is necessary to permit suspension arm 104 to pivot with respect to differential housing 540. Any of the drive shafts can be substituted for any of the other drive shafts in all the embodiments.

Counteracting Moments/Torques

A discussion of the preferred embodiments and their mode of operation follows.

In general, implement loads tend to produce loads on the rear wheels. To counteract the implement loads, each planetary system according to the preferred embodiments is configured to apply a reaction torque to the suspension arms. In effect, the preferred embodiments instantaneously stiffen the rear suspensions in response to sudden increases in draft load. Thus, the preferred embodiments generate a reaction torque that counteracts the effects of any increased implement load on the suspensions.

The reaction torque is proportional to how hard the vehicle is pulling. Since both the load on the vehicle and the torque on the suspension arm are proportional to how hard the vehicle is pulling, they are also proportional to one another.

The reaction torque that resists the compression of the suspension arm is generated by coupling one reaction-torque-producing member to the suspension arm. In each of the preferred embodiments herein, the ring gear is the reaction-torque-producing member that is coupled to the suspension arm. In each of the embodiments, the ring gear is fixed to a ring gear mount or housing that transmits the ring gear torque to the suspension arm. It is the torque applied by the ring gear to the suspension arm that resists unwanted compression of the suspension arm.

An example will illustrate how the torques are transmitted to the suspension arm. The engine applies a torque on the drive shaft to accelerate the tractor. This torque is transmitted to the sun gear. The sun gear, in turn, engages the planetary gears and applies a torque to them. The planetary gears apply a torque to the ring gear, which is fixed to the suspension arm and applies an opposing torque (i.e., a reaction torque) to the suspension arm. The planetary gears are driven inside the gear system by rolling along the inside surface of the ring gear. As they roll along the inside surface of the ring gear, they also rotate the planetary gear carrier, which is coupled to the axle. But the ring gear itself does not rotate, coupled as it is to the suspension arm. The advantage to this arrangement is that by careful selection of suspension components, hitch locations, pivot point locations and wheel size, the torque applied by the ring gear to the suspension arm can be tailored to counteract the forces causing unwanted suspension arm compression, as it does here.

Figure 7:
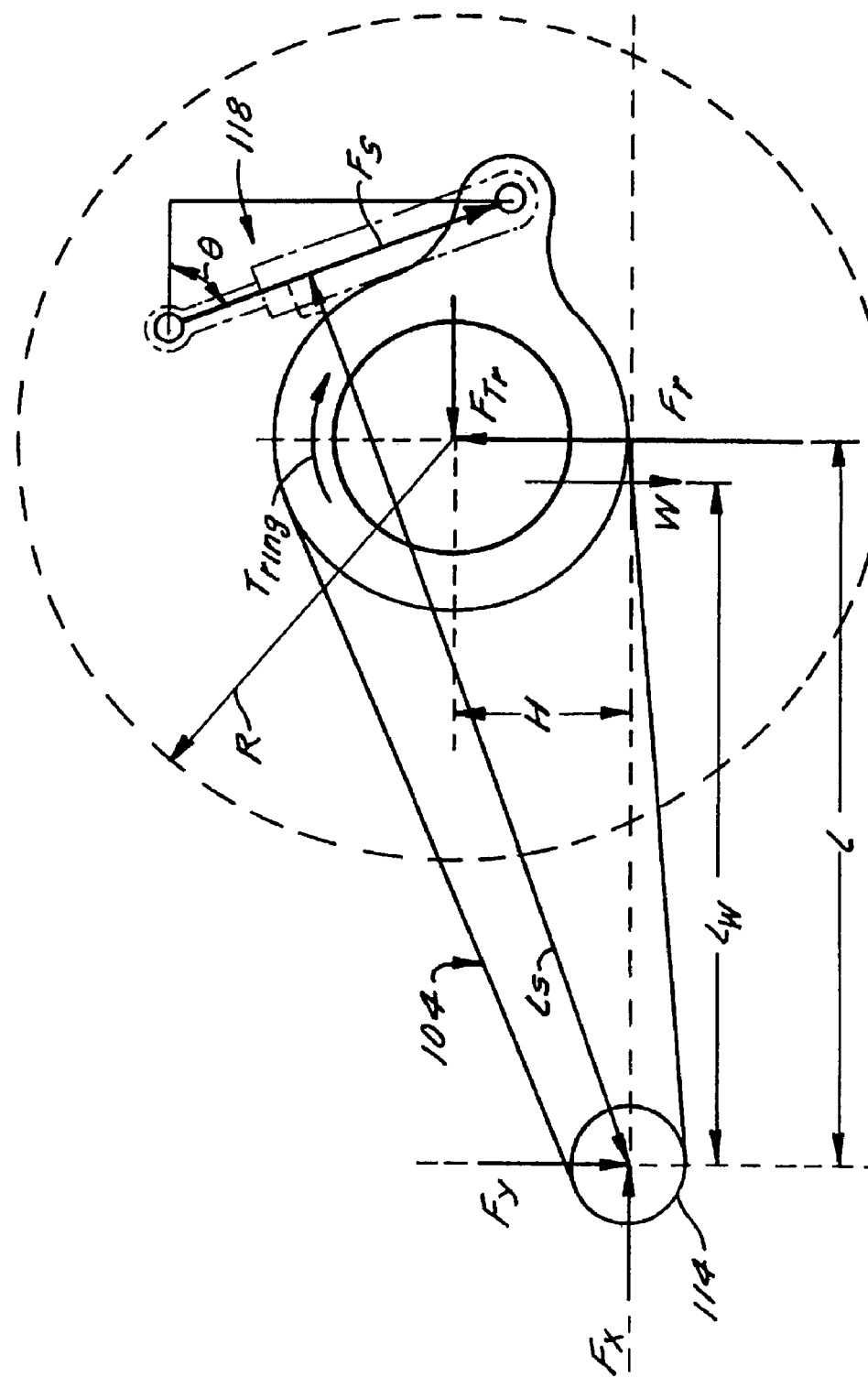
FIG. 7 is a schematic diagram showing the forces applied on a suspension arm.
Figure 8:
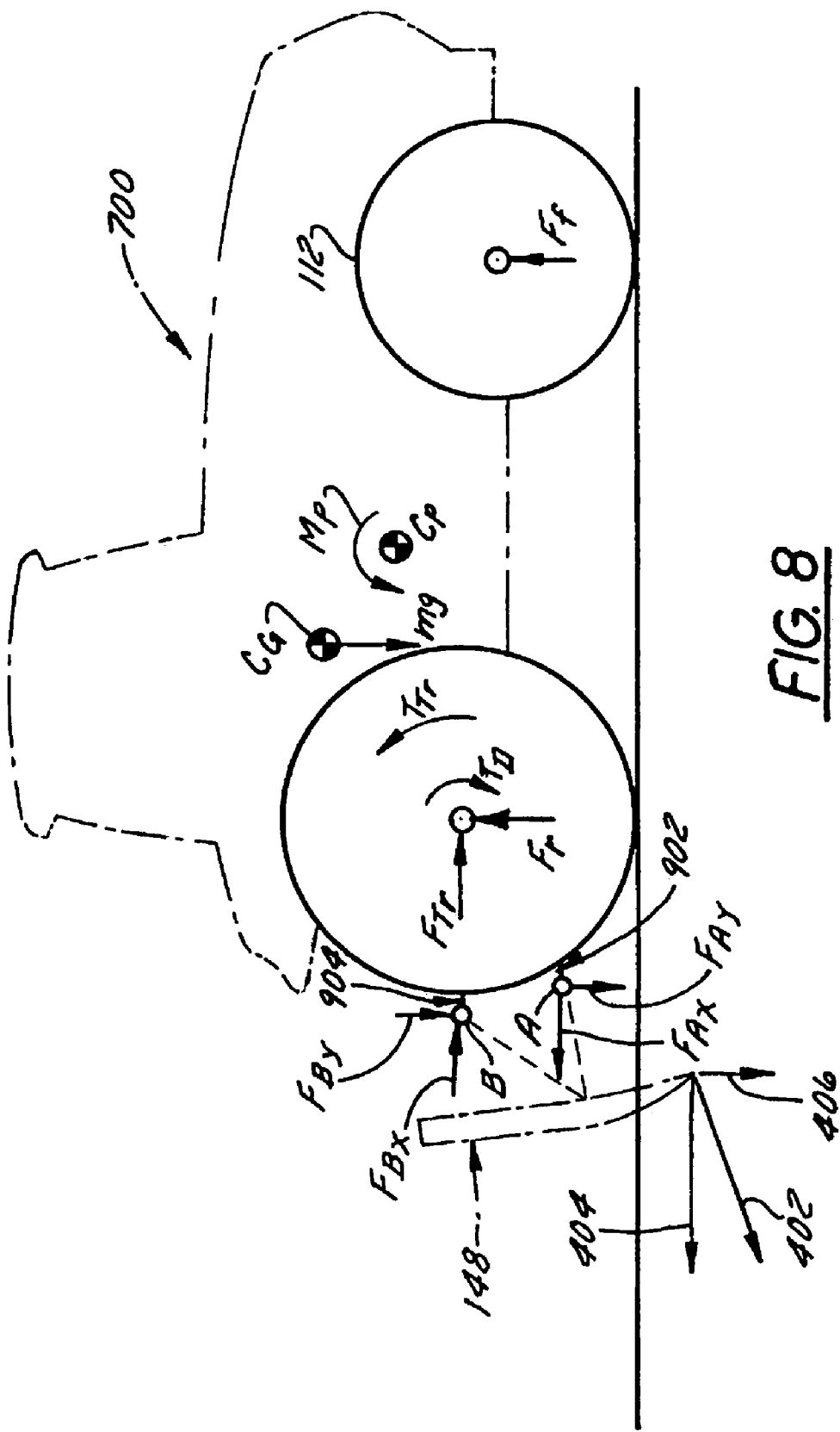
FIG. 8 is a schematic diagram showing the forces applied on the tractor by a towed implement.

The forces and torques acting on the suspension are best illustrated with reference to the schematic diagram of FIG. 7. (FIG. 7 is rotated 180° relative to the other figures, such that the back of the suspension arm is on the right-hand side of the sheet.) In the Figure, $F_x$ and $F_y$ represent the orthogonal components of the force of the tractor frame acting on the front of the suspension arm. L is the horizontal length of the suspension arm. $L_s$ is the length of the line extending from the axis of the front pivot point of the front 114 of the suspension arm 104 perpendicularly to and ending at the force vector $F_s$, which is the force that the hydraulic spring 118 applies on the suspension arm. $L_W$ is the horizontal distance between the pivot point of the front 114 of the suspension arm 104 and the center of gravity of the rear unsprung weight W. (The rear unsprung weight W includes, but is not limited to, the weight of the planetary gear system, rear wheels, a portion of the drive shaft connecting the differential to the planetary gears 500, 600, 700 and a portion of the suspension arm.) $F_r$ is the vertical force component of the total reaction force of the ground into the rear wheel. $F_{Tr}$ is a horizontal force representing the traction force, i.e., the force applied by the ground through the wheels and axles to accelerate the tractor. H is the vertical distance between the front, pivot-point axis of the suspension arm 104 and the axis of the rear wheel. $T_{ring}$ is the reaction torque that the ring gear exerts on the suspension arm. R is the radius of the rear wheel. $\Theta$ is the angle between suspension force $F_S$ and the horizontal.

At steady-state conditions, the vertical and horizontal forces sum to zero, as do the moments about the pivot axis 114 axis. This gives us the following relations:

$$F_{Tr} - F_x - F_s \cdot \cos\theta = 0 \qquad (1)$$

$$F_r - F_y - W - F_s \cdot \sin\theta = 0 \qquad (2)$$

$$F_s \cdot L_s + T_{ring} + W \cdot L_W - F_r \cdot L - F_{Tr} \cdot H = 0 \qquad (3)$$

$F_{Tr}$ and $F_r$ are related according to the coefficient of friction, $\mu$, as follows:

$$F_{Tr} = F_r \cdot \mu. \qquad (4)$$

Moreover, $T_{ring}$ is the reaction torque that the ring gear applies to the suspension arm 104. $T_{ring}$ is related to the input torque (i.e., the torque applied on the planetary carrier) and the gear ratio, as follows:

$$T_{ring} = (F_{Tr} \cdot R) \cdot \frac{Z_r}{Z_S + Z_r}, \qquad (5)$$

Where:
$Z_s$ is the number of teeth on the sun gear; and
$Z_r$ is the number of teeth on the ring gear.

By substituting Equation (4) into Equation (5), we obtain:

$$T_{ring} = (F_r \cdot \mu \cdot R) \cdot \frac{Z_r}{Z_S + Z_r} \qquad (6)$$

Substituting Equations (4) and (5) into Equation (3), we get:

$$Fs = \frac{F_r}{L_s} \cdot \left(L + \mu \cdot H - \mu \cdot R \cdot \frac{Z_r}{Z_S + Z_r}\right) - \frac{W \cdot L_W}{L_S} \qquad (7)$$

From Equation (7), one of ordinary skill will appreciate that the force on the spring cylinder can be placed within acceptable design parameters by adjusting the length of the suspension arm, the height of the front pivot point relative to the rear axle axis, and the final gear ratio. Also, Equation (7) shows that the reaction torque applied on the suspension arm 104 by the ring gear (the reaction torque is represented in Equation (7) by the last term in parenthesis that is proportional to Equation (6)) is the opposite sign as the other terms, indicating that the reaction torque will reduce the magnitude of the force applied on the spring 118 of the rear suspension.

Although FIG. 7 depicts a front pivot point below the rear axis, the pivot point may also be placed above the rear axis. In such configuration, Equation (3) will be modified by changing the sign of the term $F_{Tr} \cdot H$. (That is, the moment attributable to $F_{Tr}$ will become clockwise, rather than counterclockwise). Likewise, the term $\mu \cdot H$ in Equation (7) will change sign, thus reducing the magnitude of the force $F_S$ on the spring. Stated another way, when the pivot point of the suspension arm is above the rear axis, the magnitude of $F_S$ is either smaller or more negative.

Preferably, the variables will be chosen so that the force $F_S$ on the spring is negative (i.e., downward in FIG. 7) during field operations. This way, the spring will always be compressed by a downward force during field operations, and the construction of the spring 118 can thereby be rendered less expensive.

Finally, Equation (7) will illustrate to one of ordinary skill that a wide range can be chosen for the variables depicted therein. For example, variables such as H, L, $L_S$, $Z_r$, and $Z_s$ can be chosen to meet various design requirements while still reducing or eliminating the effect of implement forces on the suspension springs, and, as a consequence, on the pitch of the tractor.

From the foregoing detailed description of the preferred embodiments, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

I claim:

1. An agricultural tractor having a sprung rear suspension, the tractor comprising:
    a longitudinally extending chassis;
    a left suspension arm pivotally coupled to the chassis at a first pivot point to pivot about a first pivot axis;
    a right suspension arm pivotally coupled to the chassis at a second pivot point to pivot about a second pivot axis;
    a first spring coupled to and between the left suspension arm and the chassis;
    a second spring coupled to and between the right suspension arm and the chassis;
    a first planetary gear casing fixed to the left suspension arm, said first gear casing housing a first ring gear fixed with respect to the left arm and a first planetary gear carrier, said first planetary gear casing further housing a first sun gear;
    a second planetary gear casing fixed to the right suspension arm, said second gear casing housing a second ring gear fixed with respect to the right arm and a second planetary gear carrier, said second planetary gear casing further housing a second sun gear;
    a left axle having a first rotational axis, wherein the first rotational axis is located above and behind the first and second pivotal axes, said left axle being fixed to the first planetary gear carrier;
    a right axle having a second rotational axis, wherein the second rotational axis is located above and behind the first and second pivotal axes, said right axle being fixed to the second planetary gear carrier; and
    wherein the tractor further comprises first and second drive shafts having dual flexible couplings; said first and second drive shafts being coupled to the first and second sun gears, respectively, to drive said first and second sun gears.

2. The tractor of claim 1, wherein the first and second drive shafts extend laterally from a differential to the first and second sun gears, respectively.

3. The tractor of claim 2, wherein the first and second gear casings further house first and second ring gear carriers that are fixed to the left and right arms, respectively.

4. The tractor of claim 3, wherein the first gear casing includes a first pair of bearings that extend between the first ring gear carrier and the first planetary gear carrier to support the first planetary gear carrier for rotation with respect to the first ring gear carrier, and further wherein the second gear casing includes a second pair of bearings that extend between the second ring gear carrier and the second planetary gear carrier to support the second planetary gear carrier for rotation with respect to the second ring gear carrier.

5. The tractor of claim 4, wherein the first and second pairs of bearings support the first and second planetary gear carriers for rotation inside the first and second ring gear carriers, respectively.

6. The tractor of claim 4, wherein the first and second pairs of bearings support the first and second planetary gear carriers for rotation outside the first and second ring gear carriers respectively.

7. A rear suspension for an agricultural tractor having a longitudinally extending chassis and two rear drive wheels, comprising:
    a suspension arm pivotally couplable to the chassis at a first pivot point to pivot about a pivot axis;
    a spring coupled to the suspension arm and couplable to the chassis;
    a planetary gear system fixed to the suspension arm, said gear system including a ring gear fixed with respect to the suspension arm and a planetary gear carrier, said planetary gear system further including a sun gear;
    an axle having a rotational axle, said axle being fixed to the planetary gear carrier and configured to support a rear wheel of the agricultural tractor, said rotational axis being located above and behind the pivotal axis; and
    wherein the tractor further comprises a drive shaft having dual flexible couplings; said drive shaft being drivingly coupled to the sun gear.

8. The tractor of claim 7, wherein the drive shaft is configured to extend laterally from a differential to the sun gear.

9. The tractor of claim 8, wherein the gear system further includes a ring gear carrier that is fixed to the suspension arm.

10. The tractor of claim 9, wherein the gear system further includes a pair of bearings that extend between the ring gear carrier and the planetary gear carrier to support the planetary gear carrier for rotation with respect to the ring gear carrier.

11. The tractor of claim 10, wherein the pair of bearings supports the planetary gear carrier for rotation inside the ring gear carrier.

12. The tractor of claim 10, wherein the pair of bearings supports the planetary gear carrier for rotation about the outside of the ring gear carrier.

* * * * *